VARIABLE POWER LEVEL FREQUENCY MODULATION TRANSMITTER

Filed May 24, 1963 4 Sheets-Sheet 1

INVENTORS:
Wayne R. Johnson
Flavio S.C. Branco
By Keith D. Beecher
Attorney

INVENTORS:
Wayne R. Johnson
Flavio S. C. Branco
By Keith D. Beecher
Attorney

VARIABLE POWER LEVEL FREQUENCY MODULATION TRANSMITTER

INVENTORS
Wayne R. Johnson
Flavio S. C. Branco
By Keith D. Beecher
Attorney

July 19, 1966 W. R. JOHNSON ET AL 3,262,056

VARIABLE POWER LEVEL FREQUENCY MODULATION TRANSMITTER

Filed May 24, 1963 4 Sheets-Sheet 4

INVENTORS:
Wayne R. Johnson
Flavio S.C. Branco
By Keith D. Beecher
Attorney

United States Patent Office 3,262,056
Patented July 19, 1966

3,262,056

VARIABLE POWER LEVEL FREQUENCY MODULATION TRANSMITTER

Wayne R. Johnson, Woodland Hills, and Flavio S. C. Branco, Van Nuys, Calif., assignors to Winston Research Corporation, Los Angeles, Calif., a corporation of California Filed May 24, 1963, Ser. No. 282,982
2 Claims. (Cl. 325—145)

The present invention relates to angle modulation, or suppressed carrier amplitude modulation, transmission systems; and it relates more particularly to an improved transmission system in which the average power requirements are extremely low as compared with the usual prior art transmission systems of the same general type.

The transmission system of the present invention is similar in concept to the systems described and claimed in copending application Serial No. 237,128 filed November 13, 1962 in the name of Wayne R. Johnson; and in copending application Serial No. 265,596 filed March 14, 1963 (now abandoned), likewise, in the name of Wayne R. Johnson.

The transmission systems described in the copending applications are capable, for example, of transmitting a frequency modulated video signal carrier having modulation side bands extending through a wide frequency range at a fraction of the power requirements of the equivalent prior art systems.

The transmission systems described in the copending applications are predicated upon the concept of varying the power utilized by the system at any instant in accordance with the amount of bandwidth information being transmitted at that particular instant. The usual present-day frequency modulated video signal, for example, occupies a maximum frequency bandwidth of the order of 6 megacycles, but utilizes only a small percentage of the bandwidth for most of the transmission. The usual prior art transmission system, however, does not take this factor into consideration.

Therefore, in most prior art transmission systems, the video information is transmitted at full transmitter power continuously, with considerable redundancy, and regardless of the actual bandwidth content of the transmitted signal which normally changes continuously during the transmission.

In the transmission systems described in the copending applications, however, a control is exerted so that the power level varies in accordance with the actual video signal side band energy content. Therefore, when the side band energy is low, the power level of the transmission system also is low, and the power of the system increases only when needed due to an increase in the side band energy content.

The infrequent intervals in which a typical video transmission system actually requires peak power are such, that average power reductions of the order of 100:1 are possible by using the concepts described in the copending applications.

In the transmission system described in copending application Serial No. 237,128, the above-described varying power concepts are achieved by incorporating an attenuating circuit in the system prior to the final power amplifier. In the system of that copending application, a resonant network is included in the transmission system, and this network is tuned to the center frequency of the frequency modulated carrier to be transmitted by the system. The resonant network is designed to provide a degree of attenuation to the amplitude of the frequency modulated carrier of the order of, for example, 20 decibels.

The reduced carrier amplitude applied to the final power amplifier in the system of copending application Serial No. 237,128 results in a relatively low plate current. This condition of relatively low plate current exists as long as the modulation of the carrier is such that the higher side bands are at a relatively low energy level.

However, when higher side bands of the video information transmitted by the above-mentioned system have a relatively high energy content, these side bands are emphasized and the plate current of the final power amplifier of the transmission system increases. This results in the power of the transmission system being automatically increased from a relatively low level to a required higher level, only when needed. Thus, the average power requirements of the transmitting system described in the copending application Serial No. 237,128 are relatively low, as compared with the usual prior art systems which operate continually at the increased power level and without regard to the instantaneous energy content of the side bands of the transmitted signal.

In the system of copending application Serial No. 265,-596, a resonant network is also used to alter the pass-band characteristics of the transmission system. However, in the latter case, this network is used after the final power amplifier stage. The modification in the latter system permits the more efficient class C power amplifier to be used and obviates the need for a strictly linear class A or class B power amplifier, as is the case in the first application.

In the latter system, a resonant attenuating network is included in the transmission system after the final tuned circuit, and it can be part of the final tuned circuit. This attenuating network is tuned to the center frequency of the frequency modulated transmitted carrier, and it is adjusted to attenuate the frequency modulated carrier. The reduced carrier condition, as in the embodiment described in the first patent application, persists so long as the modulation of the carrier is such that there is no energy in the higher side bands. However, the final amplifier power level rises whenever there is energy in the higher side bands of the transmitted signal.

The systems of the copending patent applications, as described above, therefore use resonating networks to achieve their desired characteristics. However, although these systems operate with a high degree of efficiency, their minimum bandwidth requirements and minimum power levels are finite and material, especially at the higher carrier frequencies, this being because the minimum requirements and levels in such systems depend, not on the actual energy content of the side bands transmitted signal, but on the quality factor (Q) of the resonant attenuating networks.

The transmission system of the present invention is constructed to provide the desired attenuating characteristics of the resonant networks used in the systems of the aforementioned copending applications, by a control of characteristics of the final power amplifier itself; so that the amplifier exhibits an effective response characteristic equivalent to the response of the attenuating resonant networks of the systems of the copending applications.

An object of the present invention, therefore, is to provide an improved system for the transmission of information, by which the information can be transmitted with a material reduction in the average power requirements of the system, as compared with the usual prior art transmission systems of the same general type.

Another object of the invention is to provide such an improved transmission system in which the minimum bandwidth requirements and power levels are not limited to any appreciable extent by the quality factors of the resonant networks in the systems, or in any other manner; and in which such minimum bandwidth requirements and power levels can actually approach zero.

Yet another object is to provide such an improved transmission system by which information can be transmitted with a material reduction in the average power requirements of the system; and which system can be used efficiently for the transmission high frequency, angle modulated, or suppressed carrier amplitude modulated carriers.

Other objects and advantages of the invention will become apparent from a consideration of the following specification. The specification may best be understood by reference to the accompanying drawings, in which.

Figure 1:
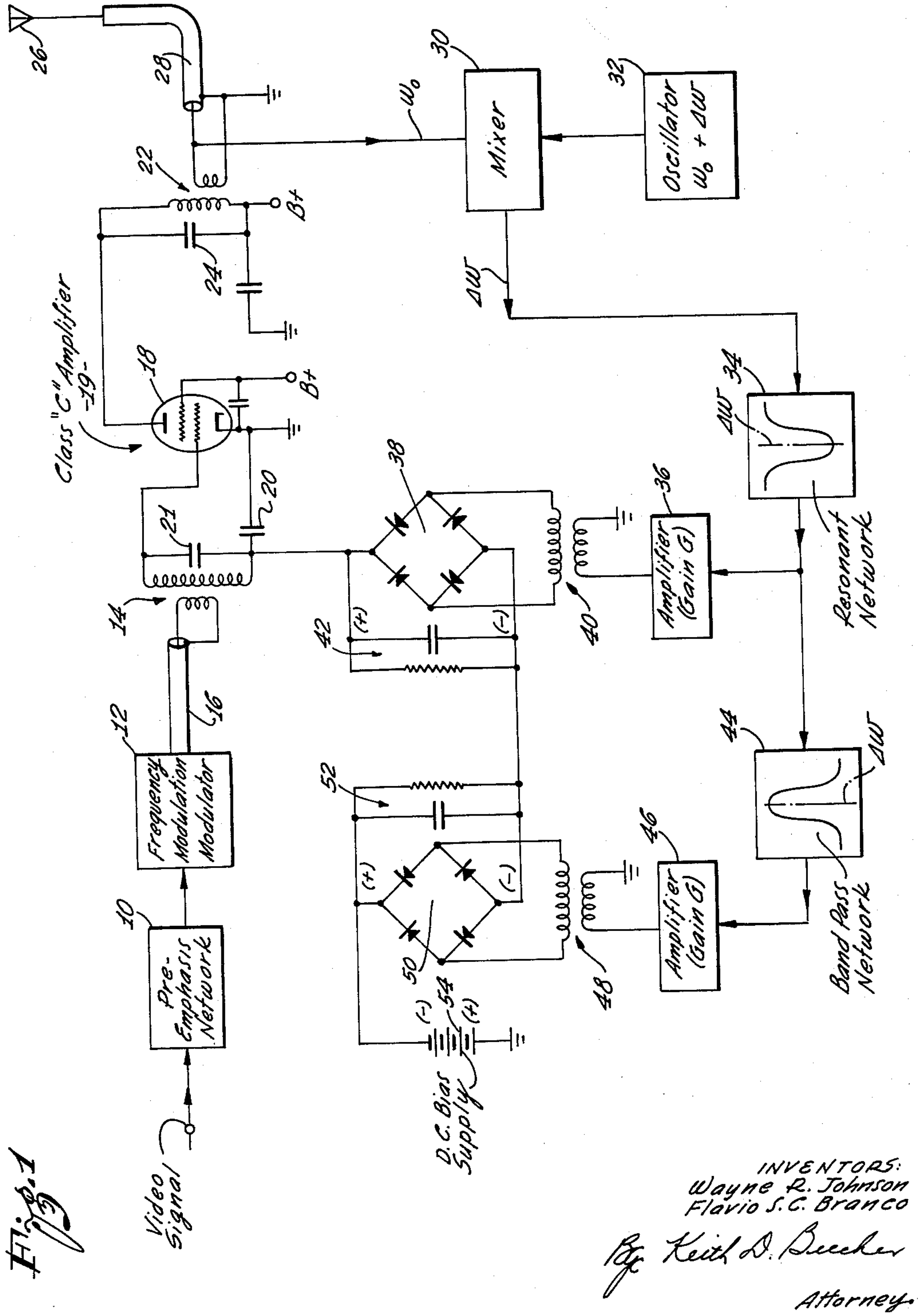
FIGURE 1 is a representation of a portion of a transmission system, shown partially in block form and partially in circuitry, and incorporating one embodiment of the invention.

The system of FIGURE 1 includes a usual pre-emphasis network 10 which responds to a video signal from any appropriate source, and which applies the video signal to a typical frequency modulation modulator 12. The resulting output from the frequency modulator 12 is a usual frequency modulated carrier having a center frequency $\omega_0$ and having its high frequency components pre-emphasized by the network 10.

The output from the modulator 12 is fed to a coupling transformer 14 through a usual coaxial line 16. The coupling transformer 14 has one terminal connected to the control grid of a pentode 18, and the other terminal of the secondary is connected to a grounded capacitor 20. A capacitor 21 is shunted across the secondary for tuning purposes.

The pentode 18 is connected as a class C final power amplifier 19. The anode of the pentode is connected to the primary winding of a transformer 22, the other terminal of the primary being connected to the positive terminal B+. The primary winding of the transformer 22 is shunted by a capacitor 24 so as to provide a tuned output circuit. The secondary of the transformer 22 is coupled to an antenna 26 through a usual coaxial line 28.

Therefore, the circuit of the class C final power amplifier 19 serves to amplify the frequency modulated carrier from the modulator 12, so that an amplifier frequency modulated signal may be radiated from the antenna 26.

In carrying out the concepts of the embodiment of the invention shown in FIGURE 1, a mixer 30 is coupled to the secondary of the transformer 22, and a reference oscillator 32 is coupled to the mixer 30. The reference oscillator 32 generates, for example, a signal having a frequency $\omega_0+\Delta\omega$ and this signal is mixed in the mixer 30 with the carrier signal frequency $\omega_0$ to produce the heterodyned frequency modulated output signal $\Delta\omega$.

It will be appreciated that the frequency modulated output signal from the mixer 30 has a center frequency corresponding to $\Delta\omega$, and that the center frequency $\Delta\omega$ is deviated in accordance with the frequency modulations of the transmitted carrier. Therefore, the output signal from the mixer 30 has all the characteristics of the frequency modulated signal, except that it is of substantially lower frequency.

The frequency modulated output signal from the mixer 30 is passed through a parallel resonant attenuating network designated by the block 34, and this network serves to attenuate the center frequency component $\Delta\omega$ of the frequency modulated output signal, and to pass the frequency modulation side bands with decreased attenuation, as a function of the displacement of the side bands from the center frequency.

The attenuated output from the network 34 is amplified in a high gain amplifier 36 and coupled to a full-wave rectifying bridge 38 through a transformer 40. The resulting signal across the secondary of the transformer 40 is filtered in a usual resistance-capacitance filter 42, so that a positive biasing voltage appears across the filter network.

It will be appreciated that the quality factor of the resonant network 34 need not be critically high, because of the relatively low frequency $\Delta\omega$ of the output signal from the mixer 30. It will also be appreciated that so long as the side bands of the transmitted frequency modulated signal have a minimum of energy content, that the output signal will be attenuated by the resonant network 34, so that the bias on the pentode 18 will be at a relatively low level.

However, whenever the side band energy content of the transmitted frequency modulated carrier signal rises, the resonant network 34 produces emphasized signals which are amplified in the amplifier 36. These amplified signals result in an increase in the bias potential across the filter 42, so that the gain of the class C final power amplifier 19 is increased.

Therefore, the power level of the final power amplifier 19 of the system is controlled in accordance with the side band energy content of the transmitted carrier signal, and the power of that stage signal is increased to a high level only when the side band energy content of the transmitted carrier signal is such as to require increased transmitter power. In the transmission system of FIGURE 1, material savings in the average power requirements of the system are realized. As mentioned above, these savings can be of the order of 100:1 over the prior art systems of the same general type.

The system of FIGURE 1, as thus far described, is somewhat unstable in that it is not only responsive to frequency deviations from $\Delta\omega$ of the output signal from the mixer 30 to vary the power level of the final amplifier, but the system is also responsive to amplitude variations of that signal. Therefore, without further compensation, the operation of the described system of FIGURE 1 is cumulative, and the final amplifier would be rapidly driven to saturation. However, this latter effect can be obviated by the provision of a band-pass network 44 coupled to the output of the resonant network 34. The band-pass network 44 is designed to exhibit reciprocal characteristics to those exhibited by the resonant network 34.

The output of the band-pass network 44 is coupled through a high gain amplifier 46, and through a coupling transformer 48 to a full-wave rectifier bridge 50. The amplifier 46 may exhibit the same characteristics as the amplifier 36, and the bridge rectifier 50 may be connected in the same manner as the bridge rectifier 38. A resistance-capacitance filter 52 is connected across the bridge rectifier 50, and the voltage developed across the filter 52 is of a polarity to buck the voltage developed across the filter 42. The filters 52 and 42 are connected in series with a bias supply source 54. This latter source supplies the unidirectional bias potential to the pentode 18.

It will be appreciated that due to the reciprocal characteristics of the networks 34 and 44, the bias voltage developed across the filter 52 is dependent only upon amplitude changes in the signal from the mixer 30, and is not dependent upon frequency changes of the signals. The potential developed across the filter 42, on the other hand, is dependent upon frequency changes in the signal from the mixer 30, due to the action of the resonant network 34, and also upon amplitude changes of the signal. As mentioned above, the bias potential across the filter 42 cancels any bias potentials developed across the filter 42 which was due to amplitude changes of the aforesaid signal, so that the remaining potential appearing across the filters 42 and 52 is due solely to frequency changes of the signal from the mixer 30. Therefore, a stable system is provided, and the aforesaid cumulative effects which would result in saturation of the final amplifier are eliminated.

The system of FIGURE 1 operates, therefore, in a manner similar to the systems described in the copending applications, and it exhibits a varying power level as determined by the requirements of the transmitted information. Also, due to the fact that the resonant network 34 is included in a relatively low frequency circuit as compared with the transmitted carrier frequency, the minimum power level of the system can be made to approach zero, without the concurrent requirement of an excessively high quality factor (Q) for the network 34.

Figure 2:
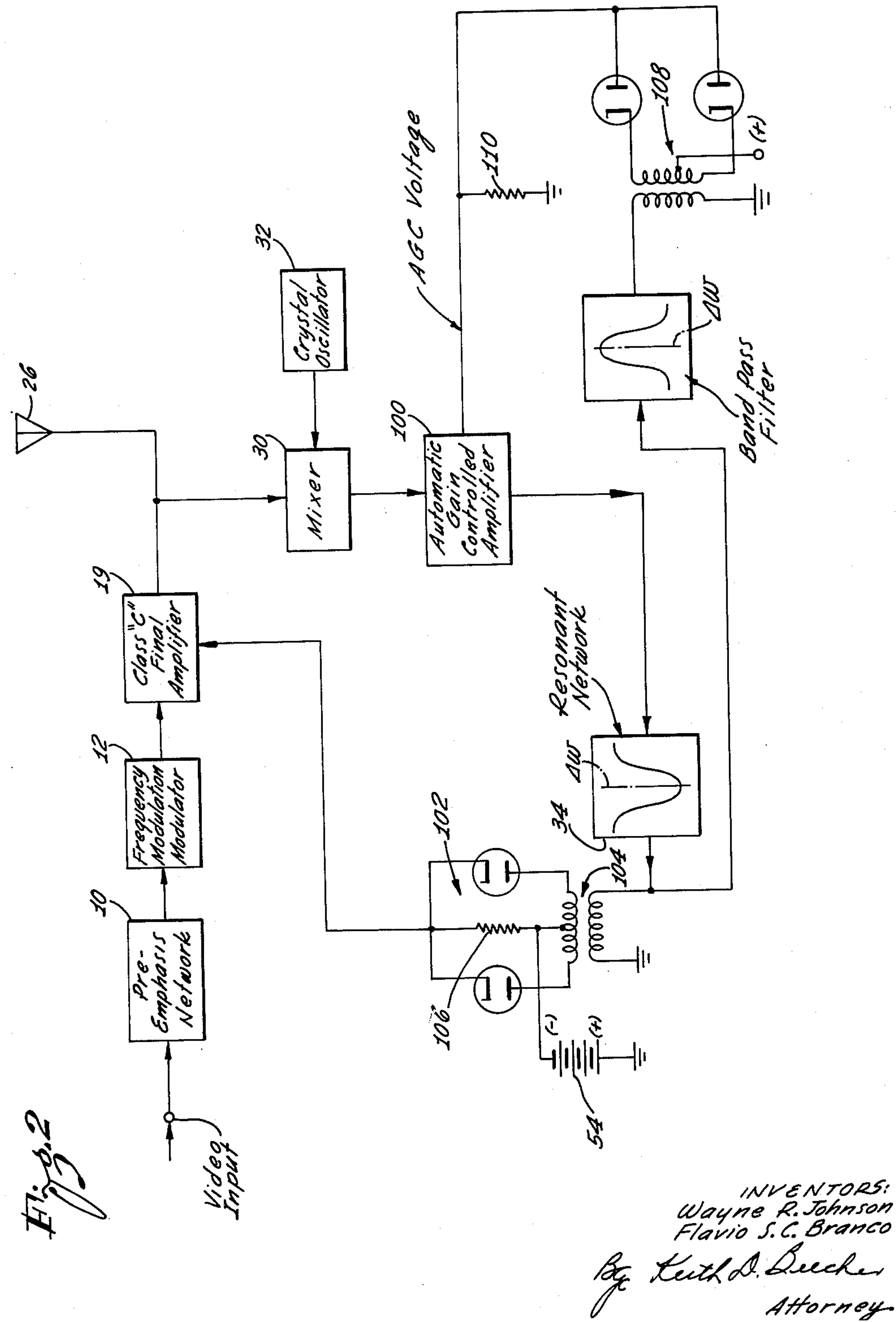
FIGURE 2 is a diagram, similar to the diagram of FIGURE 1, and representing a second embodiment of the invention.

The system of FIGURE 2 is similar in many respects to the system of FIGURE 1, and like components have been designated by the same numbers.

In the system of FIGURE 2, the output from the mixer 30 is passed through an amplifier 100 which is of the automatic gain controlled type. The output from the amplifier 100 is passed through the parallel resonant network 34, and the attenuated output from the network 34 is fed to a full-wave rectifier 102 through a coupling transformer 104. The rectified output from the rectifier 102 appears across a resistor 106, and this resistor is connected in series with the bias supply source 54 and the amplifier 19.

As before, the gain of the amplifier 19, and accordingly its power requirements, are a function of the transmitted signal, by virtue of the operation of the network 34.

In the embodiment of FIGURE 2, the instability and regenerative characteristics of the control loop of the transmission system are compensated by interposing the band-pass filter 44 between the output of the network 34 and a full-wave rectifier 108. The resulting direct current output from the rectifier 108 appears across a grounded resistor 110 and is applied to the amplifier 100 as an automatic gain control voltage.

As in the circuit of FIGURE 1, therefore, the automatic gain control voltage developed across the resistor 110 is independent of frequency shifts of the signal from the mixer 30. However, any amplitude shifts of the signal are reflected in an increase in the automatic gain control voltage, so as to reduce the gain of the amplifier 100. In this manner, compensations may be made, and the control loop be made dependent only upon frequency variations of the signal from the mixer 30.

Therefore, in the embodiment of FIGURES 1 and 2, the transmitted frequency modulated carrier signal is heterodyned to a lower frequency, and highly selective filters are used to control the final power amplifier stage 19 of the transmission system.

The system of FIGURE 2 has certain advantages over the system of FIGURE 1 in that the system of FIGURE 1 requires very high voltages in order to be linear. Moreover, the compensating bias networks 38 and 50 of FIGURE 1 are somewhat difficult to design so as to obtain a wide bandwidth in the operation of the transmission system. In the system of FIGURE 2, the bandwidth of the transmitted signal can be any convenient value.

The final power amplifier 19 of the systems of FIGURES 1 and 2 is normally biased down to approximately $\frac{1}{100}$ of its maximum power when the modulation of the carrier is a minimum, and the control can be such that the center carrier frequency is reduced at this point essentially to zero.

Figure 3:
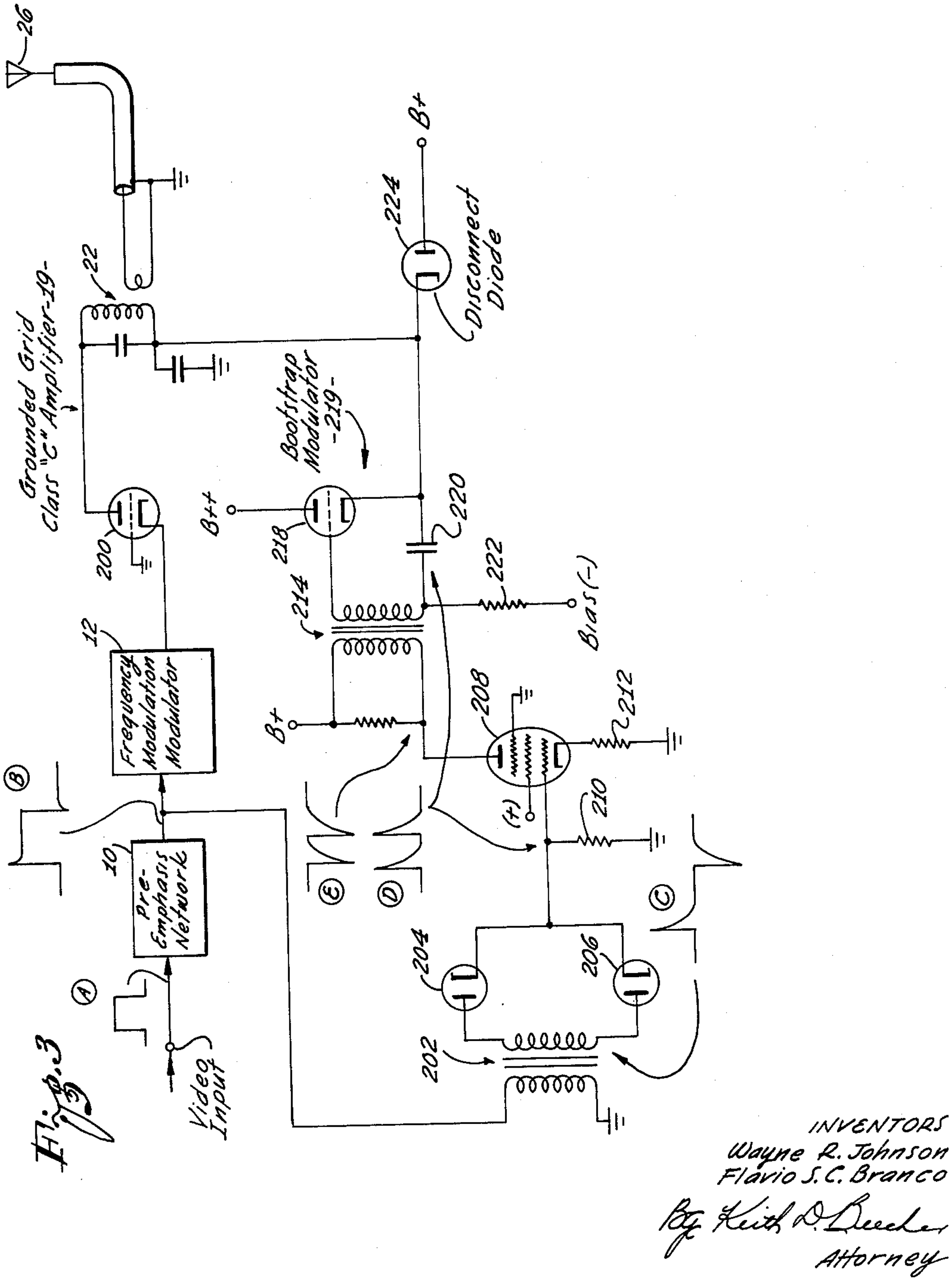
FIGURE 3 is a representation, partially in block form and partially in circuit detail, of a portion of a transmission system predicated on somewhat different principles than the systems of FIGURES 1 and 2.

In the system of FIGURE 3, a grounded grid class C power amplifier 19 is used, and the output from the frequency modulation modulator 12 is coupled to the cathode of a grounded grid triode 200 in the amplifier. The anode of the triode 200 is coupled through the transformer 22 to the antenna 26.

The output from the pre-emphasis network 10 is connected to the primary of a transformer 202. The secondary of the transformer 202 is connected to the anodes of a pair of diodes 204 and 206, the center tap of the secondary being grounded. The cathodes of the diodes 204 and 206 are connected together and to the control grid of a pentode 208, the control grid being connected to a grounded resistor 210.

The cathode of the pentode 208 is connected to a grounded resistor 212, and the anode is connected through a coupling transformer 214 to the positive terminal B+ of a source of unidirectional potential.

The secondary of the transformer 214 is connected to the control grid of a triode 218 and through a capacitor 220 to the cathode of the triode. The latter terminal of the secondary is also connected through a resistor 222 to the negative terminal of an appropriate biasing source. The triode 218 is connected as a known type of boot strap modulator 219, and its anode is connected directly to the positive terminal B++ of a source of unidirectional potential.

The cathode of the triode 218 is connected to the primary of the coupling transformer 222 and to the cathode of a diode 224. The anode of the diode 224 is connected to the positive terminal B+ of the unidirectional potential source.

In a condition to be examined, the video input to the pre-emphasis network 10 is assumed to have a pulse shape, as shown by the curve A. The pre-emphasis network operates in known manner to transform the pulse A into a pulse signal B having its leading and trailing edges pre-emphasized.

The latter pulse is used to modulate the carrier in the frequency modulator 12, so that the transmitted signal has high frequency pre-emphasis. The pre-emphasis techniques serves to boost the high frequency video components of the information to be transmitted. The technique of pre-emphasis in frequency modulation transmission is, of course, well known.

It is usual in the prior art frequency modulation transmitters, for example, to use a resistance-capacitance network for accentuating the higher frequency video components. The reason for the use of pre-emphasis networks in frequency modulation systems is that the most disturbing noise occurs at the frequencies of the low amplitude higher frequency video components.

Compensating de-emphasis networks are used in the frequency modulation receivers to restore the correct amplitudes of the received video signals. A discussion of pre-emphasis in frequency modulation systems may be found, for example, in the text book "Frequency Modulation" by August Hund, First Edition (1942), published by the McGraw Hill Book Company.

The transformer 202 responds to the pre-emphasized signal from the network 10, and acts as a differentiating means to pass only the high frequency components of the signal to the circuit of the diodes 204 and 206, as shown by the curve C. The diodes rectify the signal C and apply a series of pulses D to the amplifier 208. The amplifier 208 amplifies and inverts these pulses, so that they appear as pulses E in the primary circuit of the transformer 214.

When the system of FIGURE 3 is operating under a condition in which the energy of the modulation side bands of the transmitted carrier signal is relatively low, the amplitude of the resulting pulses derived from the pre-emphasized signal B are relatively low, so that the output from the boot strap modulator 219 is insufficient to render the disconnected diode 224 non-conductive. Therefore, under these conditions, a steady state potential B+ is applied to the amplifier 19, and the amplifier operates at a small fraction of its maximum power.

However, when the high frequency components of the video signal have material energy content, the resulting pulses applied to the boot strap modulator 219 have a relatively high amplitude, and these pulses serve to modulate the amplifier 19 at a relatively high power level, each of the pulses rendering the disconnect diode 224 non-conductive. Therefore, the final amplifier 19 is pulsed by relatively high power pulses at times when the transmitted signal has a side band energy content which requires an increase in the transmitting power level.

The system of FIGURE 3 employs, therefore, high level modulation of the class C power amplifier 19. As mentioned above, when the carrier signal being transmitted by the system has low energy side band content, the high level boot strap modulator 219 is inactive, and the class voltage for the power amplifier 19 is applied through the disconnect diode 224. During such intervals, the average input power is about 1% of the normal peak power of the amplifier.

When a transition occurs, and high frequency video information is to be transmitted by the system, a transition occurs, and the output from the pre-emphasis network 10 exhibits peaks of material amplitude. The transformer 202 eliminates the low frequency component of the signal from the pre-emphasis network 10, and the resulting high frequency peak signals are rectified by the diodes 204 and 206, as mentioned, and applied to the amplifier circuit of the pentode 208. The pulse signal is then coupled through the transformer 214 to the boot strap modulator of the triode 218. When the pulse output from the boot strap modulator rises above the level B+, the diode 224 disconnects and allows the voltage to rise. The voltage pulses from the boot strap modulator 218 can rise to approaching B++, so as to provide the required power to the amplifier 19, when needed.

Figure 4:
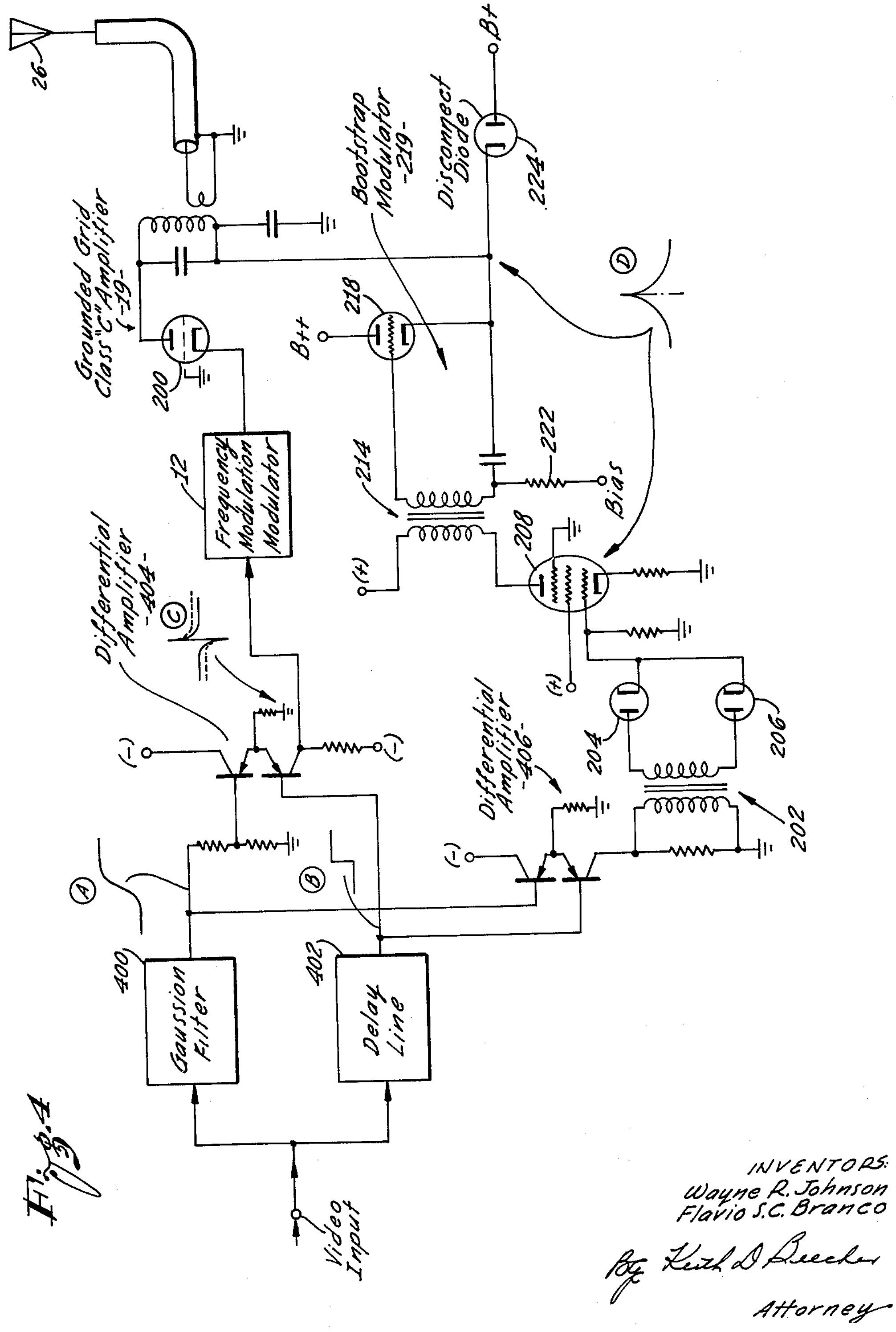
FIGURE 4 is a representation of a system similar to the system of FIGURE 3.

The system of FIGURE 4 is essentially similar to the system of FIGURE 3, except that the latter system utilizes a Gaussian type pre-emphasis network so as to provide a slow build-up of the waveform applied to the boot strap modulator and thereby reduce the bandwidth requirements of the boot strap modulator. In the latter embodiment, components similar to the circuit of FIGURE 3 are represented by the same numerals.

In the system of FIGURE 4, the pre-emphasis network 10 of FIGURE 3 has been replaced by a Gaussian-type pre-emphasis network. This latter network includes a Gaussian filter 400 which is shunted by a delay line 402. The outputs from the components 400 and 402 are applied to a differential amplifier 404.

The Gaussian filter 400 may be of the type described, for example, in the Proceedings of the Institute of Radio Engineers, November 1954, in an article by Leo Storch entitled "Synthesis of Constant-Time-Delay Ladder Networks Using Bessel Polynomials."

The nework described in the article is a low pass filter with a minimum-phase transfer function, and which is constructed to exhibit a uniform time delay as a function, of frequency. In addition, the described network has a response to abrupt amplitude transitions of the video information which closely resembles a Gaussian curve.

The pre-emphasis network of FIGURE 4 also includes the delay line 402 which exhibits a delay corresponding to the delay exhibited by the Gaussian filter 400. This delay, for example, may be of the order of .66 microsecond. The respective outputs "A" and "B" of the filter 400 and of the delay line 402 are applied to the differential amplifier 404 which functions as a partial subtractor, and the output from the differential amplifier is applied to the frequency modulator 12.

As described in the copending application Serial No. 265,596, the output waveform C from the differential amplifier 404 is such that the desired pre-emphasis is provided without any loss in signal-to-noise ratio, and with reduced carrier swing.

The outputs from the components 400 and 402 of the Gaussian pre-emphasis network are applied to a separate differential amplifier 406 which is connected to the transformer 202. The separate differential amplifier 406 is used to subtract out all the low frequency information, so that only the high frequency information is supplied to the transformer 204.

The resulting pulses applied to the pentode 208 have a more gradual slope than the pulses of the embodiment of FIGURE 3, as represented by the waveform "D." This slow build-up of the waveform "D" as mentioned above, reduces the bandwidth requirements of the boot strap modulator of the triode 218.

The invention provides, therefore, an improved transmission system in which the characteristics of the system are controlled in accordance with the side band content of the transmitted signals. As mentioned above, and as more fully described in the aforementioned copending applications, the power requirements of the transmission system are tailored to meet the side band energy content of the signal being transmitted at any particular instant. This permits the transmission system to meet the performance of the equivalent prior art transmission systems, but with a fraction of the average power requirement.

The particular system of the present invention provides the desired control of the transmission system through a control of the final amplifier in the system, rather than by the interpositioning of attenuating networks in the main path of the transmission system. This particular control as mentioned above, permits the minimum power requirements of the transmitter to approach zero, without any limitation being introduced due to the quality factors (Q) of the circuits involved.

While particular embodiments of the invention have been shown and described, modifications may be made, and it is intended in the claims to cover all modifications which fall within the spirit and scope of the invention.

What is claimed is:

1. A transmission system including: a frequency modulator circuit for developing at the output thereof a modulated signal having a selected carrier frequency; a further circuit coupled to the input of said frequency modulator circuit for introducing modulating signals to said frequency modulator circuit; a power amplifier circuit coupled to the output of said modulator circuit for amplifying a modulated signal developed thereby; a control system coupled to said power amplifier circuit and responsive to an applied control signal for applying a direct current bias potential to said amplifier to control the power level thereof; means including heterodyne mixer means coupled to one of the aforesaid circuits, for heterodyning the modulated signal to a reduced carrier frequency as compared with said selected carrier frequency, said means coupled to the output of said amplifier; a first frequency selective circuit means tuned to pass said reduced carrier frequency intercoupling said mixer to said control system for applying the control signal to said control system; further circuit means coupled to said control system for developing a direct current bias potential in response to an applied signal and for utilizing the same to adjust the aforesaid direct current bias potential; a second frequency selective circuit means having a reciprocal characteristic with respect to said first frequency selective circuit means and coupled to said first frequency selective circuit means for applying a signal to said further circuit means to cause said direct current bias potential of said further circuit means to vary in a manner to substantially eliminate variations in the amplitude of the signal from said control system resulting from amplitude variations of the signal from said heterodyne mixer means.

2. A transmission system including: a frequency modulator circuit for developing at the output thereof a modulated signal having a selected carrier frequency; a further circuit coupled to the input of said frequency modulator circuit for introducing modulating signals to said frequency modulator circuit; a power amplifier circuit coupled to the output of said modulator circuit for amplifying a modulated signal developed thereby; a control system coupled to said power amplifier circuit and responsive to an applied control signal for applying a direct current bias potential to said amplifier to control the power level thereof; means including heterodyne mixer means coupled to one of the aforesaid circuits, for heterodyning the modulated signal to a reduced carrier frequency as compared with said selected carrier frequency, said means coupled to the output of said amplifier; a first frequency selective circuit means tuned to pass said reduced carrier frequency intercoupling said mixer to said control system for applying the control signal to said control system; an automatic gain controlled amplifier interposed between said mixer means and said first frequency selective circuit means, said automatic gain controlled amplifier including a second frequency selective circuit means having a reciprocal characteristic with respect to said first frequency selective circuit means and coupled to said first frequency selective circuit means for developing an automatic gain control signal and for applying the automatic gain control signal to said automatic gain controlled amplifier to control the gain thereof inversely in response to variations in the amplitude of the signal from said mixer means.

References Cited by the Examiner

UNITED STATES PATENTS

| | | | |
|---|---|---|---|
| 2,298,930 | 10/1942 | Decino | 332—37 |
| 2,468,832 | 5/1949 | Montgomery | 332—38 |
| 2,896,073 | 7/1959 | Westphal | 325—159 |
| 3,054,073 | 9/1962 | Powers | 332—48 |
| 3,087,995 | 4/1963 | Hellstrom | 179—15 |
| 3,098,203 | 7/1963 | Starn | 332—44 |
| 3,162,729 | 12/1964 | Holt | 179—15 |

DAVID G. REDINBAUGH, *Primary Examiner.*

B. V. SAFOUREK, *Assistant Examiner.*